(12) United States Patent
Malladi et al.

(10) Patent No.: US 8,023,950 B2
(45) Date of Patent: Sep. 20, 2011

(54) SYSTEMS AND METHODS FOR USING SELECTABLE FRAME DURATIONS IN A WIRELESS COMMUNICATION SYSTEM

(75) Inventors: Durga Prasad Malladi, San Diego, CA (US); Serge Willenegger, Onnens (CH); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 10/674,040

(22) Filed: Sep. 29, 2003

(65) Prior Publication Data

US 2004/0162075 A1 Aug. 19, 2004

Related U.S. Application Data

(60) Provisional application No. 60/448,269, filed on Feb. 18, 2003, provisional application No. 60/452,790, filed on Mar. 6, 2003, provisional application No. 60/470,770, filed on May 14, 2003.

(51) Int. Cl.
*H04W 36/00* (2009.01)
(52) U.S. Cl. ............ 455/442; 455/436; 455/422.1; 455/439; 370/331; 370/329; 370/328
(58) Field of Classification Search ........... 455/442, 455/436, 437, 443, 422.1, 439; 370/331, 370/332, 335, 333, 329, 328, 331.329
See application file for complete search history.

(56) References Cited

U.S. PATENT DOCUMENTS

| | | | |
|---|---|---|---|
| 2,149,518 A | 3/1939 | Frank, Sr. | |
| 3,470,324 A | 9/1969 | Harmuth | |
| 4,768,023 A | 8/1988 | Xie | |
| 5,280,472 A | 1/1994 | Gilhousen et al. | |
| 5,394,433 A | 2/1995 | Bantz et al. | |

(Continued)

FOREIGN PATENT DOCUMENTS

CN 1166094 11/1997

(Continued)

OTHER PUBLICATIONS

Mobile Station-Base station compatibility standard for wideband spread spectrum cellular systems (ANSI/TIA/EIA-95-B-1999) (Mar. 1999).*

(Continued)

*Primary Examiner* — Ajit Patel
*Assistant Examiner* — Khai M Nguyen
(74) *Attorney, Agent, or Firm* — Sayed H. Beladi; Kristine U. Ekwueme (57) ABSTRACT

Systems and methods for setting parameters for transmissions of data from a mobile station to a base station in a wireless communications system. One embodiment comprises a method including a network detecting a mobile station entering or leaving soft handoff and responsively modifying a transmission parameter. The transmission parameter may comprise frame duration, wherein if the mobile station enters soft handoff, the frame duration is set to a larger value and if the mobile station leaves soft handoff, the frame duration is set to a smaller value. The network may determine whether the mobile station should enter or leave soft handoff based upon PSMMs and may send handoff direction messages (HDMs) to the mobile station, thereby causing the mobile station to enter or leave soft handoff and to set the transmission parameter accordingly.

46 Claims, 6 Drawing Sheets

U.S. PATENT DOCUMENTS

| | | | |
|---|---|---|---|
| 5,406,585 A | 4/1995 | Rohani et al. | |
| 5,463,342 A | 10/1995 | Guard | |
| 5,483,557 A | 1/1996 | Webb | |
| 5,535,214 A | 7/1996 | Shiobara | |
| 5,544,156 A | 8/1996 | Teder et al. | |
| 5,553,062 A | 9/1996 | Schilling et al. | |
| 5,581,575 A | 12/1996 | Zehavi et al. | |
| 5,592,470 A | 1/1997 | Rudrapatna et al. | |
| 5,627,938 A | 5/1997 | Johnston | |
| 5,647,366 A | 7/1997 | Weng | |
| 5,712,869 A | 1/1998 | Lee et al. | |
| 5,719,852 A | 2/1998 | Schilling et al. | |
| 5,726,978 A | 3/1998 | Frodigh et al. | |
| 5,732,391 A | 3/1998 | Fiocca | |
| 5,752,193 A | 5/1998 | Scholefield et al. | |
| 5,754,537 A | 5/1998 | Jamal | |
| 5,764,551 A | 6/1998 | McCorkle | |
| 5,774,809 A * | 6/1998 | Tuutijarvi et al. | 455/437 |
| 5,781,861 A * | 7/1998 | Kang et al. | 455/442 |
| 5,809,059 A | 9/1998 | Souissi et al. | |
| 5,815,526 A | 9/1998 | Rice | |
| 5,857,174 A | 1/1999 | Dugan | |
| 5,862,451 A | 1/1999 | Grau et al. | |
| 5,864,760 A | 1/1999 | Gilhousen et al. | |
| 5,875,214 A | 2/1999 | Urbaniak et al. | |
| 5,903,608 A | 5/1999 | Chun | |
| 5,914,950 A | 6/1999 | Tiedemann, Jr. et al. | |
| 5,923,650 A | 7/1999 | Chen et al. | |
| 5,956,642 A | 9/1999 | Larsson et al. | |
| 5,966,377 A | 10/1999 | Murai | |
| 5,966,670 A * | 10/1999 | Keskitalo et al. | 455/562.1 |
| 5,969,751 A | 10/1999 | Lee | |
| 5,973,642 A | 10/1999 | Li et al. | |
| 5,991,271 A | 11/1999 | Jones et al. | |
| 5,991,273 A | 11/1999 | Abu-Dayya | |
| 6,005,876 A | 12/1999 | Cimini, Jr. et al. | |
| 6,014,373 A | 1/2000 | Schilling et al. | |
| 6,046,980 A | 4/2000 | Packer | |
| 6,049,716 A * | 4/2000 | Jung | 455/442 |
| 6,052,594 A | 4/2000 | Chuang et al. | |
| 6,061,359 A | 5/2000 | Schilling et al. | |
| 6,064,692 A | 5/2000 | Chow | |
| 6,088,387 A | 7/2000 | Gelblum et al. | |
| 6,094,459 A | 7/2000 | Kao et al. | |
| 6,108,374 A | 8/2000 | Balachandran et al. | |
| 6,108,384 A | 8/2000 | Okumura et al. | |
| 6,111,911 A | 8/2000 | Sanderford, Jr. et al. | |
| 6,115,357 A | 9/2000 | Packer et al. | |
| 6,128,349 A | 10/2000 | Chow | |
| 6,128,882 A | 10/2000 | Jones | |
| 6,130,882 A | 10/2000 | Levin | |
| 6,131,016 A | 10/2000 | Greenstein et al. | |
| 6,134,215 A | 10/2000 | Agrawal et al. | |
| 6,134,218 A | 10/2000 | Holden | |
| 6,141,388 A | 10/2000 | Servais et al. | |
| 6,144,654 A | 11/2000 | Ibanez-Meier et al. | |
| 6,195,552 B1 * | 2/2001 | Jeong et al. | 455/436 |
| 6,201,576 B1 | 3/2001 | Raghunath et al. | |
| 6,201,954 B1 | 3/2001 | Soliman | |
| 6,205,129 B1 | 3/2001 | Esteves et al. | |
| 6,208,699 B1 | 3/2001 | Chen et al. | |
| 6,208,858 B1 * | 3/2001 | Antonio et al. | 455/429 |
| 6,219,374 B1 | 4/2001 | Kim et al. | |
| 6,222,875 B1 | 4/2001 | Dahlman et al. | |
| 6,222,888 B1 | 4/2001 | Kao et al. | |
| 6,233,455 B1 * | 5/2001 | Ramakrishna et al. | 455/437 |
| 6,259,746 B1 | 7/2001 | Levin et al. | |
| 6,292,515 B1 | 9/2001 | Kao et al. | |
| 6,307,844 B1 | 10/2001 | Tsunehara et al. | |
| 6,335,922 B1 | 1/2002 | Tiedemann, Jr. et al. | |
| 6,347,080 B2 | 2/2002 | Jou et al. | |
| 6,363,255 B1 | 3/2002 | Kuwahara | |
| 6,389,056 B1 | 5/2002 | Kanterakis et al. | |
| 6,414,988 B1 | 7/2002 | Ling | |
| 6,425,105 B1 | 7/2002 | Piirainen et al. | |
| 6,442,130 B1 | 8/2002 | Jones, IV et al. | |
| 6,456,653 B1 | 9/2002 | Sayeed | |
| 6,483,816 B2 | 11/2002 | Tsunehara et al. | |
| 6,490,461 B1 | 12/2002 | Muller | |
| 6,496,496 B1 * | 12/2002 | Ramakrishna et al. | 370/342 |
| 6,505,058 B1 * | 1/2003 | Willey | 455/574 |
| 6,532,363 B1 * | 3/2003 | Pussinen | 455/435.1 |
| 6,535,723 B1 | 3/2003 | Jiang et al. | |
| 6,549,561 B2 | 4/2003 | Crawford | |
| 6,563,885 B1 | 5/2003 | Magee et al. | |
| 6,570,444 B2 | 5/2003 | Wright | |
| 6,571,101 B1 | 5/2003 | Schulz | |
| 6,571,104 B1 | 5/2003 | Nanda et al. | |
| 6,574,205 B1 | 6/2003 | Sato | |
| 6,597,913 B2 | 7/2003 | Natarajan | |
| 6,609,007 B1 | 8/2003 | Eibling et al. | |
| 6,654,609 B2 * | 11/2003 | Kim | 455/437 |
| 6,680,925 B2 | 1/2004 | Wu et al. | |
| 6,701,151 B2 | 3/2004 | Diachina et al. | |
| 6,711,208 B2 | 3/2004 | Razoumov et al. | |
| 6,741,862 B2 | 5/2004 | Chung et al. | |
| 6,744,754 B1 | 6/2004 | Lee | |
| 6,751,264 B2 | 6/2004 | Ho et al. | |
| 6,751,444 B1 | 6/2004 | Meiyappan | |
| 6,757,241 B1 | 6/2004 | Jones et al. | |
| 6,760,303 B1 | 7/2004 | Brouwer | |
| 6,775,544 B2 | 8/2004 | Ficarra | |
| RE38,603 E | 9/2004 | Kim et al. | |
| 6,816,827 B1 | 11/2004 | Xia et al. | |
| 6,836,666 B2 | 12/2004 | Gopalakrishnan et al. | |
| 6,847,826 B1 | 1/2005 | Wesby et al. | |
| 6,847,828 B2 | 1/2005 | Miyoshi et al. | |
| 6,865,389 B2 * | 3/2005 | Lee et al. | 455/442 |
| 6,880,103 B2 | 4/2005 | Kim et al. | |
| 6,898,418 B2 | 5/2005 | Rauschmayer | |
| 6,904,286 B1 | 6/2005 | Dantu | |
| 6,917,581 B2 | 7/2005 | Proctor, Jr. et al. | |
| 6,937,582 B1 | 8/2005 | Kronestedt | |
| 6,952,561 B1 | 10/2005 | Kumar et al. | |
| 6,982,946 B2 | 1/2006 | Wiberg et al. | |
| 6,987,798 B2 | 1/2006 | Ahn et al. | |
| 7,006,429 B2 | 2/2006 | Yoshida et al. | |
| 7,012,912 B2 | 3/2006 | Naguib et al. | |
| 7,016,651 B1 | 3/2006 | Narasimhan | |
| 7,031,741 B2 | 4/2006 | Lee et al. | |
| 7,050,406 B2 | 5/2006 | Hsu et al. | |
| 7,054,275 B2 | 5/2006 | Kim et al. | |
| 7,061,986 B2 | 6/2006 | Tonissen et al. | |
| 7,068,702 B2 | 6/2006 | Chen et al. | |
| 7,069,038 B2 | 6/2006 | Hakkinen et al. | |
| 7,072,315 B1 | 7/2006 | Liu et al. | |
| 7,076,001 B2 | 7/2006 | Beadle et al. | |
| 7,092,706 B2 | 8/2006 | Yang | |
| 7,099,397 B2 | 8/2006 | Lee et al. | |
| 7,103,021 B2 | 9/2006 | Jou | |
| 7,120,134 B2 | 10/2006 | Tiedemann, Jr. et al. | |
| 7,126,930 B2 | 10/2006 | Pankaj et al. | |
| 7,155,236 B2 | 12/2006 | Chen et al. | |
| 7,158,504 B2 | 1/2007 | Kadaba et al. | |
| 7,164,669 B2 | 1/2007 | Li et al. | |
| 7,177,367 B2 | 2/2007 | Storm | |
| 7,187,646 B2 | 3/2007 | Schramm | |
| 7,190,964 B2 | 3/2007 | Damnjanovic et al. | |
| 7,197,085 B1 | 3/2007 | Vella-Coleiro | |
| 7,215,930 B2 | 5/2007 | Malladi | |
| 7,257,101 B2 | 8/2007 | Petrus et al. | |
| 7,269,389 B2 | 9/2007 | Petrus et al. | |
| 7,272,199 B2 | 9/2007 | Storm et al. | |
| 7,274,743 B2 | 9/2007 | Kim | |
| 7,277,709 B2 | 10/2007 | Vadgama | |
| 7,286,558 B2 | 10/2007 | Kim et al. | |
| 7,286,846 B2 | 10/2007 | Chen et al. | |
| 7,289,529 B2 | 10/2007 | Sherman | |
| 7,299,402 B2 | 11/2007 | Soong et al. | |
| 7,313,167 B2 | 12/2007 | Yoon et al. | |
| 7,317,711 B2 | 1/2008 | Bae et al. | |
| 7,327,716 B2 | 2/2008 | Fong et al. | |
| 7,336,640 B2 | 2/2008 | McDonough et al. | |
| 7,336,954 B2 | 2/2008 | Wang et al. | |
| 7,423,992 B2 | 9/2008 | Iwamura | |
| 7,447,258 B2 | 11/2008 | Pietila et al. | |
| 7,447,287 B1 | 11/2008 | Parantainen | |

| | | | |
|---|---|---|---|
| 7,463,702 B2 | 12/2008 | Ammer et al. | |
| 7,505,780 B2 | 3/2009 | Wei et al. | |
| 7,660,282 B2 | 2/2010 | Sarkar | |
| 7,706,403 B2 | 4/2010 | Hosein | |
| 2002/0021683 A1 | 2/2002 | Holtzman et al. | |
| 2002/0021692 A1 | 2/2002 | Huh et al. | |
| 2002/0051432 A1* | 5/2002 | Shin | 370/331 |
| 2002/0057730 A1 | 5/2002 | Karlsson et al. | |
| 2002/0067774 A1 | 6/2002 | Razoumov et al. | |
| 2002/0111183 A1 | 8/2002 | Lundby | |
| 2002/0131522 A1 | 9/2002 | Felgentreff | |
| 2002/0136271 A1 | 9/2002 | Hiramatsu et al. | |
| 2002/0137521 A1 | 9/2002 | Kim et al. | |
| 2002/0150077 A1 | 10/2002 | Temerinac | |
| 2002/0154610 A1 | 10/2002 | Tiedemann, Jr. et al. | |
| 2002/0160767 A1* | 10/2002 | Hanly | 455/422 |
| 2002/0172192 A1* | 11/2002 | Hunzinger et al. | 370/352 |
| 2002/0183039 A1 | 12/2002 | Padgett et al. | |
| 2003/0028251 A1 | 2/2003 | Mathews | |
| 2003/0031130 A1 | 2/2003 | Vanghi | |
| 2003/0039317 A1 | 2/2003 | Taylor et al. | |
| 2003/0081538 A1 | 5/2003 | Walton et al. | |
| 2003/0083069 A1 | 5/2003 | Vadgama | |
| 2003/0129981 A1* | 7/2003 | Kim | 455/436 |
| 2003/0137953 A1* | 7/2003 | Chae et al. | 370/331 |
| 2003/0142656 A1 | 7/2003 | Padovani et al. | |
| 2003/0152102 A1 | 8/2003 | Morgan et al. | |
| 2003/0161340 A1 | 8/2003 | Sherman | |
| 2003/0219037 A1 | 11/2003 | Toskala et al. | |
| 2004/0013102 A1* | 1/2004 | Fong et al. | 370/345 |
| 2004/0101035 A1 | 5/2004 | Boer et al. | |
| 2004/0160922 A1 | 8/2004 | Nanda et al. | |
| 2004/0160933 A1 | 8/2004 | Odenwalder et al. | |
| 2004/0203973 A1 | 10/2004 | Khan | |
| 2004/0224711 A1* | 11/2004 | Panchal et al. | 455/518 |
| 2004/0228349 A1 | 11/2004 | Vrzic et al. | |
| 2004/0228389 A1 | 11/2004 | Odenwalder | |
| 2005/0002324 A1 | 1/2005 | Sutivong et al. | |
| 2005/0004970 A1 | 1/2005 | Jain et al. | |
| 2005/0007986 A1 | 1/2005 | Malladi et al. | |
| 2005/0176456 A1 | 8/2005 | Chen et al. | |
| 2005/0254465 A1 | 11/2005 | Lundby et al. | |
| 2006/0007892 A1 | 1/2006 | Sudo | |
| 2006/0019701 A1 | 1/2006 | Ji | |
| 2006/0128410 A1 | 6/2006 | Derryberry et al. | |
| 2006/0165126 A1 | 7/2006 | Petersson et al. | |
| 2006/0183497 A1 | 8/2006 | Paranchych et al. | |
| 2006/0215737 A1 | 9/2006 | Bang et al. | |
| 2006/0264220 A1 | 11/2006 | Chen et al. | |
| 2007/0111669 A1 | 5/2007 | Malladi | |
| 2008/0043683 A1 | 2/2008 | Kwon et al. | |
| 2008/0194286 A1 | 8/2008 | Chen et al. | |

FOREIGN PATENT DOCUMENTS

| | | |
|---|---|---|
| CN | 1263675 | 8/2000 |
| EP | 0627827 A2 | 12/1994 |
| EP | 0783210 A2 | 7/1997 |
| EP | 0809364 A2 | 11/1997 |
| EP | 0921652 A2 | 6/1999 |
| EP | 1104127 | 5/2001 |
| EP | 1231807 A2 | 8/2002 |
| EP | 1236471 A2 | 9/2002 |
| EP | 1257140 A1 | 11/2002 |
| EP | 1292057 A1 | 3/2003 |
| GB | 2301687 A | 12/1996 |
| GB | 2352944 A | 2/2001 |
| JP | 08298498 A | 12/1996 |
| JP | 10013325 A | 1/1998 |
| JP | 11154919 A | 6/1999 |
| JP | 11196043 | 7/1999 |
| JP | 11508417 T | 7/1999 |
| JP | 2000299680 A | 10/2000 |
| JP | 2000513549 | 10/2000 |
| JP | 2000349740 | 12/2000 |
| JP | 2001016139 A | 1/2001 |
| JP | 2001036500 A | 2/2001 |
| JP | 2001238269 A | 8/2001 |
| JP | 2001515300 T | 9/2001 |
| JP | 2001517017 T | 10/2001 |
| JP | 2002-026808 | 1/2002 |
| JP | 200277984 | 3/2002 |
| JP | 2002508137 T | 3/2002 |
| JP | 2002508896 T | 3/2002 |
| JP | 2002159061 A | 5/2002 |
| JP | 2002522988 T | 7/2002 |
| JP | 2002-232943 | 8/2002 |
| JP | 2002528954 T | 9/2002 |
| JP | 2003008521 A | 1/2003 |
| JP | 2003018117 | 1/2003 |
| JP | 2003032218 | 1/2003 |
| JP | 2003060606 A | 2/2003 |
| JP | 2003060609 A | 2/2003 |
| JP | 2003069523 A | 3/2003 |
| JP | 2004032518 A | 1/2004 |
| JP | 2004166038 A | 6/2004 |
| JP | 2004214746 | 7/2004 |
| JP | 2004320679 A | 11/2004 |
| JP | 2005-505955 | 2/2005 |
| JP | 2005505168 | 2/2005 |
| JP | 2008072733 A | 3/2008 |
| KR | 19960015862 | 11/1996 |
| KR | 0156478 B1 | 11/1998 |
| KR | 100214293 | 5/1999 |
| KR | 20020076991 | 10/2002 |
| KR | 20020089164 | 11/2002 |
| KR | 100406531 | 11/2003 |
| RU | 2073913 C1 | 2/1997 |
| RU | 2111619 C1 | 5/1998 |
| RU | 2115246 C1 | 7/1998 |
| RU | 2120198 | 10/1998 |
| RU | 2149518 C1 | 5/2000 |
| RU | 2183910 C2 | 6/2002 |
| RU | 2189696 C2 | 9/2002 |
| WO | WO9205556 A1 | 4/1992 |
| WO | WO9507578 A1 | 3/1995 |
| WO | WO9510144 A1 | 4/1995 |
| WO | WO9701256 A1 | 1/1997 |
| WO | WO9733399 A1 | 9/1997 |
| WO | 9835525 | 8/1998 |
| WO | WO9836606 A2 | 8/1998 |
| WO | WO9901994 A2 | 1/1999 |
| WO | WO9904525 | 1/1999 |
| WO | WO9907089 A1 | 2/1999 |
| WO | WO9912282 A1 | 3/1999 |
| WO | WO9929054 A1 | 6/1999 |
| WO | WO0008869 A2 | 2/2000 |
| WO | WO0042752 A1 | 7/2000 |
| WO | WO0048328 A1 | 8/2000 |
| WO | 0072622 | 11/2000 |
| WO | WO0065743 A1 | 11/2000 |
| WO | WO0106714 | 1/2001 |
| WO | WO0110159 A1 | 2/2001 |
| WO | WO0117158 A1 | 3/2001 |
| WO | WO0124568 A1 | 4/2001 |
| WO | WO0128194 A1 | 4/2001 |
| WO | WO0141318 A2 | 6/2001 |
| WO | WO0199303 A2 | 12/2001 |
| WO | WO0199312 A1 | 12/2001 |
| WO | WO0201762 A1 | 1/2002 |
| WO | WO0231991 | 4/2002 |
| WO | WO0233838 A2 | 4/2002 |
| WO | WO0237693 A2 | 5/2002 |
| WO | WO0241531 A2 | 5/2002 |
| WO | WO02063818 A1 | 8/2002 |
| WO | WO02065664 A2 | 8/2002 |
| WO | WO02080400 A2 | 10/2002 |
| WO | WO02095960 | 11/2002 |
| WO | WO03084163 A1 | 10/2003 |
| WO | WO2005015942 A1 | 2/2005 |
| WO | 95012297 | 12/2008 |

OTHER PUBLICATIONS

TIA/EIA Standard, Mobile station-base station compatibility standard for wideband spread spectrum cellular systems, TIA/EIA-95-B, ANSI/TIA/EIA-95-B-1999.*

"Mobile Station-Base Station Compatibility Standard For Wideband Spread Spectrum Cellular Systems" *TIA/EIA Interim Standard*, Feb. 3, 1999, XP002145331, pp. 6-380, 6.

The CDMA2000 ITU-R RTT Candidate Submission, *Telecommunications Industry Association TIA*, Jul. 27, 1998, XP002294165, pp. 1-145.

International Search Report—PCT/US04/004787, International Search Authority—European Patent Office, Sep. 13, 2004.

International Preliminary Report on Patentability—PCT/US2004/004787, International Search Authority—IPEA/US—Alexandria, Virginia—Apr. 19, 2006.

Written Opinion—PCT/US2004/004787, International Search Authority—European Patent Office—Sep. 13, 2004.

TA EIA interim Standard IS-856-1, 'CDMA.2000 High Rate Packet Data Air Interface Specification. Addendum "I,' Jan. 2002. pp. 9-23-9-57, XP002299790.

"Universal Mobile Telecommunication System (UMTS); Physical channels and mapping of transport channels onto physical channels (FDD) (3GPP TS 25.211 version 5.3.0 Release 5)", ETSI TS 125 211 v 5.3.0 (Dec. 2002), pp. 1-52.

3G TS 25.211 "Physical channels and mapping of transport channels onto physical channels (FDD)", Release 5, V5.0.0, Mar. 2002.

3G TS 25.212 "Multiplexing and channel coding (FDD)", Release 5, V5.0,0, Mar. 2002.

3G TS 25.213 "Spreading and modulation (FDD)", Release 5, V5.0.0, Mar. 2002.

3G TS 25.214 "Physical layer procedures (FDD)", Release 5, V5.0,0, Mar. 2002.

3GPP2 C.50024: CDMA 2000 High Rate Packet Data Air interface Specification', 3RD 0254 Generation Partnership Project 2, "3GPP2" Sep. 12, 2000. pp. I, xxxix 6-1-6-77, 8-1-8-54.

3rd Generation Partnership Project, Technical Specification Group Radio Access Network: 3GPP TS 25.322 V4.7.0; Radio Access Link Control (RLC) Protocol Specification; Release 4, Dec. 2002, pp. 1-76.

Attar R.A et al. A reverse link outer-loop power control algorithm for cdma2000 1xEV systems, ICC 2002. 2002 IEEE International Conference on Communications, New York, NY, vol. 1 of 5. Apr. 28, 2002, pp. 573-578. XP010589559.

Chen, Tau, "Method and Apparatus for Forward Link Power Control During Soft Handoff in a Communication System", U.S. Appl. No. 60/356,929 entitled, filed Feb. 12, 2002, QUALCOMM Incorporated.

Gyung-Ho Hwang et al. Distributed Rate Control for Throughput Maximization and DOS Support in WCDMA System', 2001 IEEE. Oct. 7-11, 2001, pp. 1721-1725.

Hamaguchi, et al., "Characteristics of Orthogonal Slow-FH/16QAM method applying Interference-resistant Demodulation," Proceedings of Inst. Of Electronics, Information and Communication Engineers, B-II, Jun. 25, 1995, vol. J78, B-II. No. 6, pp. 445-453.

Nandagopal T et al: "Service differentiation through end-to-end rate control in low bandwidth wireless packet networks" Mobile Multimedia Communications, 1999. 1999 IEEE international workshop on San Diego, CA USA Nov. 15-17, 1999 Piscataway. NJ, USA IEEE.

Sarkar S et al., "Adaptive Control of the Reverse Link to CDMA2000", International Journal Of Wireless Information Networks, PLENUM PRESS, NY, US, vol. 9, No. 1/Jan. 2002, pp. 55-70, XP002300880, ISSN: 1068-9605.

Sarkar S., et al., "CDMA2000 Reverse Link: Design and System Performance" VTC 2000-Fall. IEEE VTS 52nd, Vehicular Technology Conference, Boston; MA, Sep. 24-28, 2000. vol. 6 of 6 Conf. 52, pp. 2713-2719.

Sohn et al., "Blind Rate Detection Algorithm in WCDMA Mobile Receiver". IEEE 54th Vehicular Technology Conference Proceedings, Atlantic City, NJ, Oct. 7, 2001, pp. 1589-1592.

Sunay, M, Oguz, et al.: "Provision of Variable Data Rates in Third Generation Wideband DS CDMA System,"wireless Communications and Networking Conference, 1999, Sep. 21, 1999, pp. 505-509.

The CDMA 2000 ITU-R RTT Candidate Submission 0. 18 Online Jul. 27, 1998.

TIA/EIA-95; "Mobile Station- Base Station Compatibility Standard For Wideband Spread Spectrum Cellular Systems"(Apr. 1999).

TIA/EIA/IS-856-1;"CDMA 2000 High Rate Packet Data Air Interface Specification" Addendum 1(Jun. 2002).

You Y-H, et al.: MC-VSG BNET System for High-Rate Wireless Personal Area Network Applications, IEEE Transactions on Consumer Electronics, IEEE Inc.: New York US, vol. 48, No. 2, May 2002, pp. 254-264.

Young-Joo Song et al. "Rate-Control Snoop : A Reliable Transport Protocol for Heterogeneous Networks with Wired and Wireless Links", IEEE Proceedings 2003, vol. 2, Mar. 16, 2003, pp. 1334-1338. Cited by other.

Young-UK Chung et al., "An Efficient Reverse Link Data Control Scheme for 1xEV-DV System," IEEE 54TH. Vehicular Technology Conference Proceedings. Atlantic City. NJ, Oct. 7-11, 2001. IEEE, US. vol. 1 of 4, Conf. 54, Oct. 10, 2001, pp. 820-823.

3GPP2 C: "CDMA 2000 High Rate Packet Data Air Interface Specification C.S0024" 3GPP Standards, Sep. 12, 2000, XP002206456 cited in the application.

Chakravarty S et al: "An Algorithm for Reverse Traffic Channel Rate Control for CDMA 2000 High Rate Packet Data Systems" GLOBECOM"OI. 2001 IEEE GLOBAL Telecommunications Conference. San Antonio, TX, Nov. 25-29, 2001, IEEE Global Telecommunications Conference , NewYork, NY : IEEE, US, x vol. vol. 6 of 6, Nov. 25, 2001, pp. 3733-3737, XP002277693.

3GPP2 C.S0024, Version 2.0: "cdma2000 High Rate Packet Data Air Interface Specification," pp. 1-441 (Oct. 27, 2000).

ETSI TS 125.211 v3.5.0 (Dec. 2000); "Universal Mobile Telecommunications Systems (UMTS); Physical channels and mapping of transport channels onto physical channels (FDD)," 3GPP TS 25.211 version 3.5.0 Release 1999).

SKLAR, "Digital Communications, Fundamentals and Applications", 4 pages, 2001. Prentice-Hall PTR. Upper Saddle River. New Jersey. USA.

TIA/EIA-IS-2000 Release C, "Introduction to cdma2000 Standards for Spread Spectrum Systems, Release C" (3GPP2 C.S0001-C, Version 1.0) May 28, 2002.

Adachi, F. et al: "Wideband Multi-rate DD-CDMA for Next Generation Mobile Communications Systems", Wireless Communications Conference (1997). Boulder, CO, USA Aug. 11-13, 1997, NewYork, NY, USA, IEEE, US, Aug. 11, 1997, pp. 57-62, XP010245557, DOI: D0I:10.1109/WCC.1997.622247, ISBN: 978-0/7803-41 94-4.

European Search Report—EP10178999, Search Authority—Munich Patent Office, Nov. 11, 2010.

Fuji!, T. et al., "Best Effort Cell Structure Using Sub-carrier Selected MC-CDMA System," The Institute of Electronics, Information and Communication Engineers, Nov. 15, 2002, vol. 102, No. 465, pp. 65-72, IEICE Technical Report RCS 2002-203 (English Abstract).

Schreiber, W.F; "Spread-Spectrum Television Broadcasting", SMPTE Journal, SMPTE Inc. Scarsdale, N.Y. US, vol. 101, No. 8, Aug. 1. 1992, pp. 538-549, XP000296026, ISSN: 0036-1682.

* cited by examiner

SYSTEMS AND METHODS FOR USING SELECTABLE FRAME DURATIONS IN A WIRELESS COMMUNICATION SYSTEM

CLAIM OF PRIORITY UNDER 35 U.S.C. §119

The present application is a non-provisional application claiming priority to provisional application Ser. No. 60/448,269, entitled "REVERSE LINK DATA COMMUNICATION", filed on Feb. 18, 2003; U.S. provisional application Ser. No. 60/452,790, entitled "METHOD AND APPARATUS FOR A REVERSE LINK COMMUNICATION IN A COMMUNICATION SYSTEM", filed on Mar. 6, 2003; and U.S. provisional application Ser. No. 60/470,770, entitled "OUTER-LOOP POWER CONTROL FOR REL. D", filed on May 14, 2003.

BACKGROUND

1. Field of the Invention

The invention relates generally to the field of telecommunications, and more particularly to mechanisms for controlling data transmission parameters for wireless communications channels based upon prevailing transmission characteristics of the channels.

2. Related Art

Wireless communication technologies are rapidly advancing, and wireless communication systems are utilized to provide a larger and larger portion of the communications capacity that is currently available to users. This is true despite the additional technological impediments that are faced in implementing a wireless communication system, as compared to a wireline system. For instance, wireless communication systems must deal with issues relating to power control between a base station and its mobile stations in order to maximize the performance of the system, whereas a wireline system does not.

One type of wireless communication system comprises a cellular CDMA (code division multiple access) system which is configured to support voice and data communications. This system may have multiple base stations which communicate via wireless channels with multiple mobile stations. (The base stations are also typically coupled via wireline networks to various other systems, such as a public switched telephone network.) Each base station communicates with a set of mobile stations that are within a sector corresponding to the base station.

It is typically a goal of a wireless communication system to optimize the performance of the system by maximizing the data throughput of the system. This data throughput may include contributions from each of the mobile stations with which the base station communicates. Because the base station typically communicates with multiple mobile stations, the system cannot simply allow communications between the base station and one of the mobile stations to be optimized at the expense of communications with the other mobile stations. On the other hand, the system cannot allow communications with all of the mobile stations to use the highest power levels, data rates and other transmission parameters that are physically possible because they would likely generate so much interference that little, if any, of the data would actually be successfully transmitted. It is therefore necessary for the system to implement controls on the communications with the different mobile stations in order to provide an acceptable level of service to each of them.

A complicating factor in the control of the communications between a base station and various mobile stations is that the mobile stations may be in communication with more than one base station. While a mobile station which is located in close proximity to a first base station generates interference that primarily affects the mobile stations in the same sector, mobile stations that are farther from the base station may generate interference that significantly affects mobile stations in other sectors. While a single base station can handle the first situation relatively easily, it has no knowledge of mobile stations in other sectors, and may therefore require complicated backhaul signaling to handle the second situation. It would therefore be desirable to provide a means to handle the second situation which increases system performance in relation to all of the base stations and corresponding sectors.

SUMMARY OF THE INVENTION

One or more of the problems outlined above may be solved by the various embodiments of the invention. Broadly speaking, the invention comprises systems and methods for setting parameters for transmissions of data from a mobile station to a base station in a wireless communications system. One embodiment of the present invention comprises a method for determining when conditions are appropriate for a mobile station to enter or leave a soft handoff state, and setting transmission parameters for the mobile station based upon whether or not the mobile station is in soft handoff.

One embodiment of the present invention comprises a method implemented in a wireless communication system having one or more base stations connected to a network and one or more mobile stations that are in communication with the base stations. The method includes the steps of detecting a mobile station entering or leaving soft handoff and modifying a transmission parameter for the mobile station in response to detecting the mobile station entering or leaving soft handoff. In one embodiment, the transmission parameter comprises a frame size, wherein if the mobile station is in soft handoff, the frame size is set to a first size (e.g., 10 milliseconds) and wherein if the mobile station is not in soft handoff, the frame size is set to a second size (e.g., 2 milliseconds). In one embodiment, the mobile station measures pilot signal strengths for each of one or more base stations and periodically transmits pilot strength measurement messages (PSMMs) to the network via the one of the base stations. The network determines whether to direct the mobile station to enter or leave soft handoff based upon the received PSMMs and, if necessary, sends a handoff direction message (HDM) to the base station, which transmits the HDM to the mobile station. In response to receiving the HDM, the mobile station enters or leaves soft handoff as directed by the network and also sets the transmission parameter (e.g., frame size) accordingly. The mobile station then transmits a handoff completion message the network after entering or leaving soft handoff and setting the transmission parameter.

An alternative embodiment of the present invention comprises a wireless communication system. The system includes a network, a base station and a mobile station, wherein the mobile station is configured to set a transmission parameter according to whether or not the mobile station is in soft handoff. In one embodiment, the transmission parameter comprises frame size, and the mobile station is configured to set the frame size to a first, greater value if the mobile station is in soft handoff, and to set the frame size to a second, smaller value if the mobile station is not in soft handoff. In one embodiment, the mobile station is configured to measure a pilot signal strength for each of one or more base stations and to periodically transmit PSMMs to the network. The network in this embodiment is configured to identify a change in a number of base stations in the active set (the set of base stations with which the mobile station communicates) for the mobile station (based on the PSMMs) and to direct the mobile station to enter or leave soft handoff based on the change in the number of base stations in the active set. The network then sends a handoff direction message (HDM) to the mobile station. The mobile station is configured to enter or leave soft handoff, to modify the transmission parameter in response to receiving the HDM and then to transmit a handoff completion message to the network.

Numerous additional embodiments are also possible.

BRIEF DESCRIPTION OF THE DRAWINGS

Various aspects and features of the invention are disclosed by the following detailed description and the references to the accompanying drawings, wherein.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION OF A PREFERRED EMBODIMENT

One or more embodiments of the invention are described below. It should be noted that these and any other embodiments described below are exemplary and are intended to be illustrative of the invention rather than limiting.

As described herein, various embodiments of the invention comprise systems and methods for setting parameters for transmissions of data from a mobile station to a base station in a wireless communications system. One embodiment of the present invention comprises a method for determining when conditions are appropriate for a mobile station to enter a soft handoff state, and setting transmission parameters for the mobile station based upon whether or not the mobile station is in soft handoff.

In one embodiment, the method is implemented in a wireless telecommunications system having a plurality of base stations and a plurality of mobile stations. Each of the mobile stations can move throughout the geographic area within which the base stations provide communication service. As each mobile station moves within this area, the quality of each of the communication links between the mobile station and various ones of the base stations may change. Typically, when a mobile station is relatively close to a base station, the quality of the corresponding communication link is good, and transmission parameters for the communication link may be set to support a high data transmission rate (e.g., a shorter frame period may be used). As the mobile station moves toward the edge of the sector which is served by the base station, the quality of the communication link is usually degraded, and it is typically necessary to set the transmission parameters for the communication link to support a reduced data rate (in order to provide an acceptable error rate).

One of the problems with trying to adjust the transmission parameters of the communication link according to the quality of the link is that it is typically necessary to perform a significant amount of signaling between the mobile station and the base station simply to have enough information to appropriately adjust the transmission parameters. This signaling represents overhead that reduces the bandwidth available for data transmissions. The signaling also generates interference that may reduce the throughput of other mobile stations. The various embodiments of the present invention may eliminate a substantial amount of this communication overhead by setting transmission parameters based upon conditions that are known to apply. These conditions are known from currently used overhead information.

In one embodiment, it is assumed that a mobile station which is in soft handoff is near the edge of the sector being served by the base station. It is therefore also assumed that the quality of the communication link between the mobile station and the base station is not sufficient to support a high data rate. Consequently, whenever the mobile station is in soft handoff (i.e., the mobile station is communicating with more than one base station), the frame size (i.e., the amount of time over which a frame of data is transmitted) is set to the larger of two frame sizes. This larger frame size corresponds to a lower data rate, which requires less power to achieve an acceptable error rate. When the mobile station is not in soft handoff, the frame size is set to the smaller of these sizes. In one embodiment, frame sizes of either 10 milliseconds (in soft handoff) or 2 milliseconds (not in soft handoff) are used.

In one embodiment, the frame size is set as part of the handoff direction messaging process. In this embodiment, a mobile station communicates primarily with a single base station. The mobile station is configured to periodically determine the strength of pilot signals that are received, not only from the primary base station, but from each base station from which a pilot signals is received. The mobile station is also configured to periodically transmit pilot strength measurement messages (PSMMs) to the primary base station, indicating the strength of the pilot signals from each base station. The pilot strength information is forwarded to a switching station or other network to which all of the base stations are connected. Based upon the pilot strength information, is determined whether or not the mobile station should be in soft handoff between multiple base stations. Messages are then forwarded to the mobile station if necessary to direct the mobile station to enter or leave a state in which the mobile station is in soft handoff. When the mobile station receives one of these messages, the mobile station not only enters or leaves a soft handoff state, but also automatically sets the transmission parameters (e.g., the frame size) to the appropriate values for the current state of the mobile station.

The various embodiments of the present invention may provide a number of advantages over the prior art. For example, because the embodiment described above utilizes a soft handoff mechanism that is already present, no additional signaling is necessary to provide the information needed by the mobile station to determine whether the frame size should be set to the larger or smaller of the two possible values. Still other advantages will be apparent to those of skill in the art of the invention.

Figure 1:
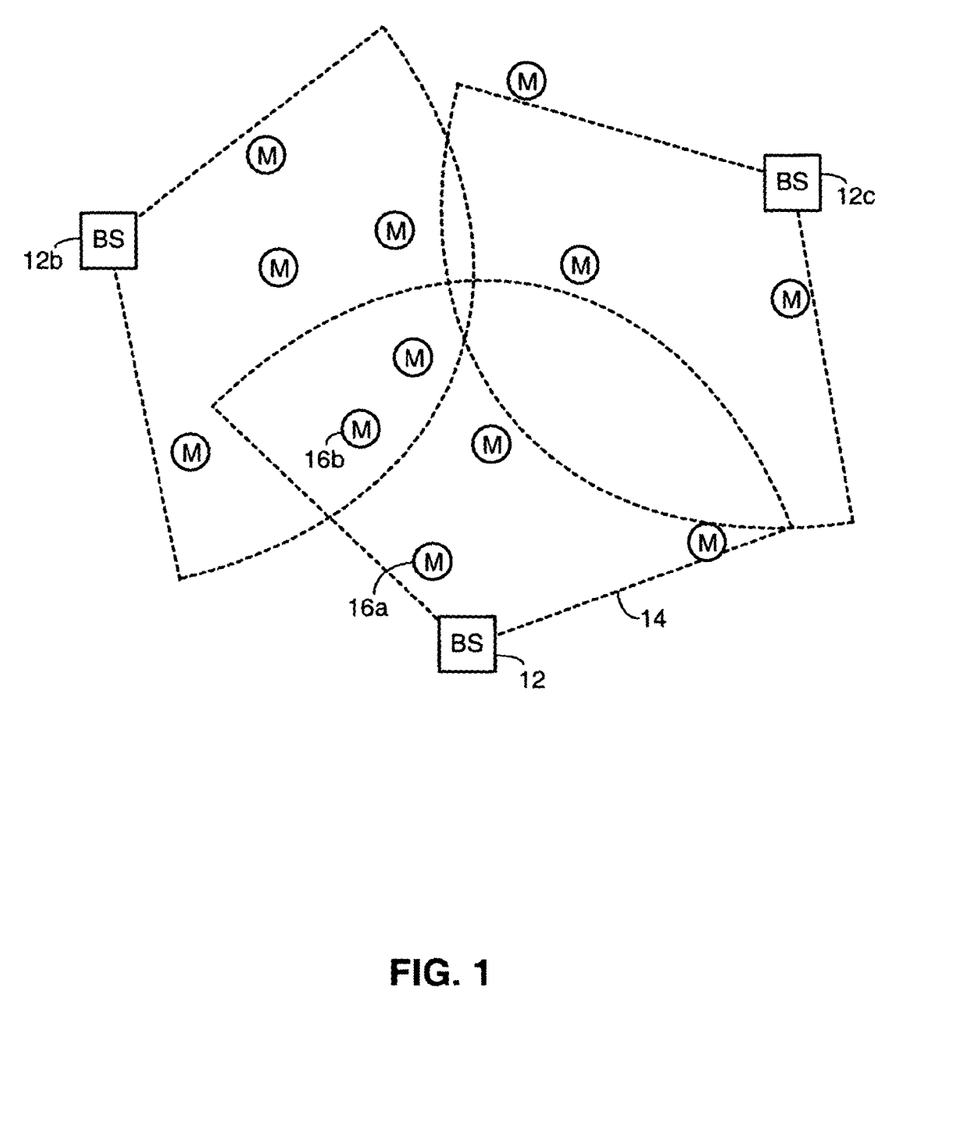
FIG. 1 is a diagram illustrating an exemplary arrangement of base stations, the respective sectors served by the base stations, and mobile stations in a wireless telecommunications system in accordance with one embodiment.

Referring to FIG. 1, a diagram illustrating a plurality of base stations and a plurality of mobile stations in a wireless telecommunications system in accordance with one embodiment is shown. FIG. 1 depicts three of the base stations 12 in the system. Many more base stations may also be included in the system. Each base station 12 has an associated sector 14, which is simply a coverage area wherein mobile stations in the area can communicate with the base station. (While the sectors in the figure are distinctly delineated by dotted lines, the sectors do not have distinct boundaries, but instead have more graduated boundaries that are determined by the strength of the signals communicated between the corresponding base station and the mobile stations in the sector.) A number of mobile stations 16 are shown scattered throughout the coverage area of the combined sectors.

It should be noted that, for purposes of clarity, not all of the base stations, sectors, and mobile stations in the figure are identified by corresponding reference numbers. Where each of these elements of the network is referred to herein by the corresponding reference number without a lowercase letter (e.g., "12"), the reference is applicable to any of the identical elements. Where the elements are referred to by the corresponding reference number followed by a lowercase letter (e.g., "12a"), the reference is applicable to the particular element identified in the figure.

Figure 2:
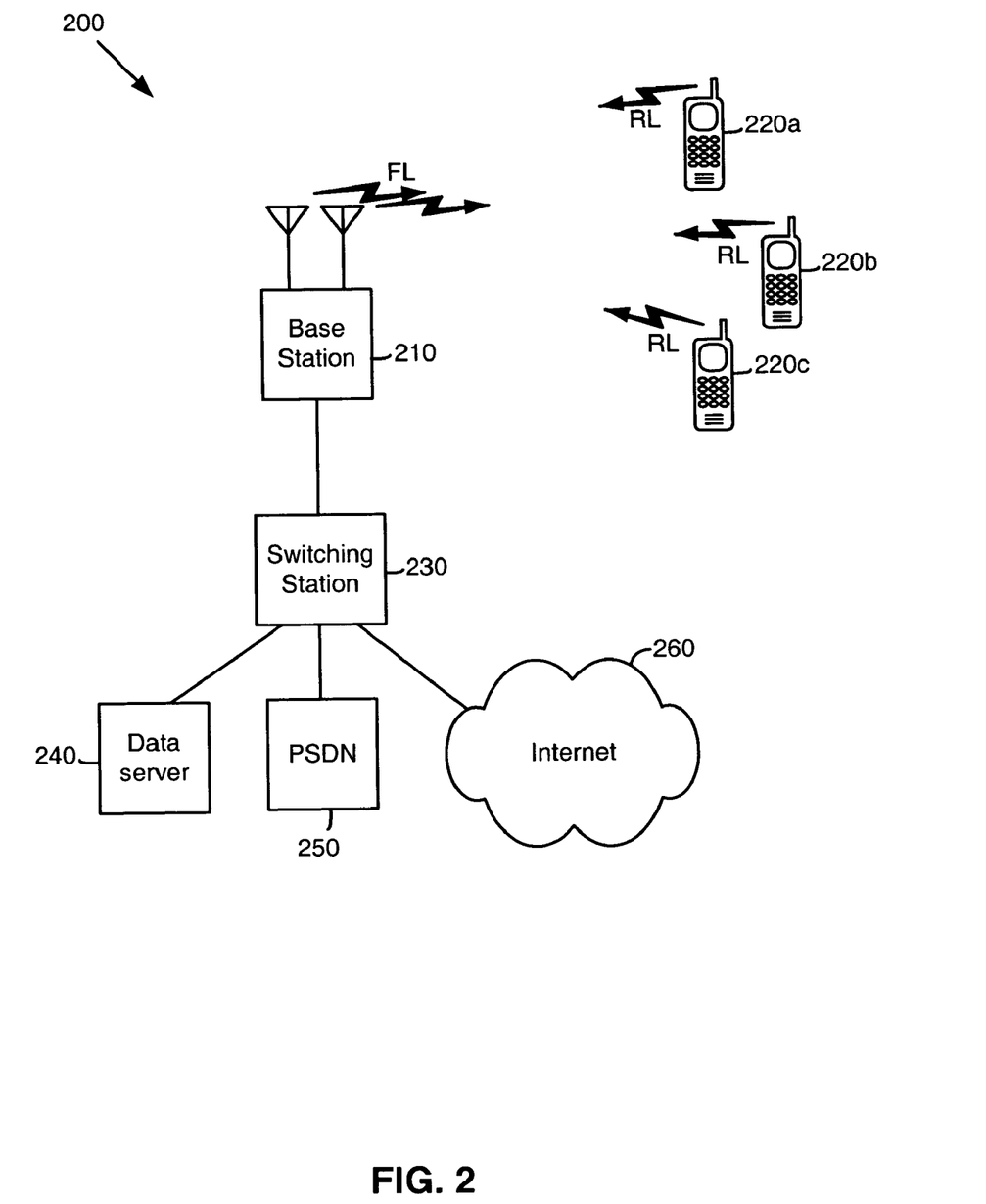
FIG. 2 is a diagram illustrating the structure of an exemplary wireless communications system in accordance with one embodiment.

Referring to FIG. 2, a diagram illustrating the structure of an exemplary wireless communications system is shown. As depicted in this figure, system 200 comprises a base station 210 that is configured to communicate with a plurality of mobile stations 220. Mobile stations 220 may, for example, be cellular telephones, personal information managers (PIMs or PDA), or the like that are configured for wireless communication. It should be noted that these devices need not actually be "mobile," but may simply communicate with base station 210 via a wireless link. Base station 210 transmits data to mobile stations 220 via corresponding forward link (FL) channels, while mobile stations 220 transmit data to base station 210 via corresponding reverse link (RL) channels.

It should be noted that, for the purposes of this disclosure, identical items in the figures may be indicated by identical reference numerals followed by a lowercase letter, e.g., 220a, 220b, and so on. The items may be collectively referred to herein simply by the reference numeral.

Base station 210 is also coupled to a switching station 230 via a wireline link. The link to switching station 230 allows base station 210 to communicate with various other system components, such as a data server 240, a public switched telephone network 250, or the Internet 260. It should be noted that the mobile stations and system components in this figure are exemplary and other systems may comprise other types and other combinations of devices.

While, in practice, the specific designs of base station 210 and mobile stations 220 may vary significantly, each serves as a wireless transceiver for communicating over the forward and reverse links. Base station 210 and mobile stations 220 therefore have the same general structure. This structure is illustrated in FIG. 3.

Figure 3:
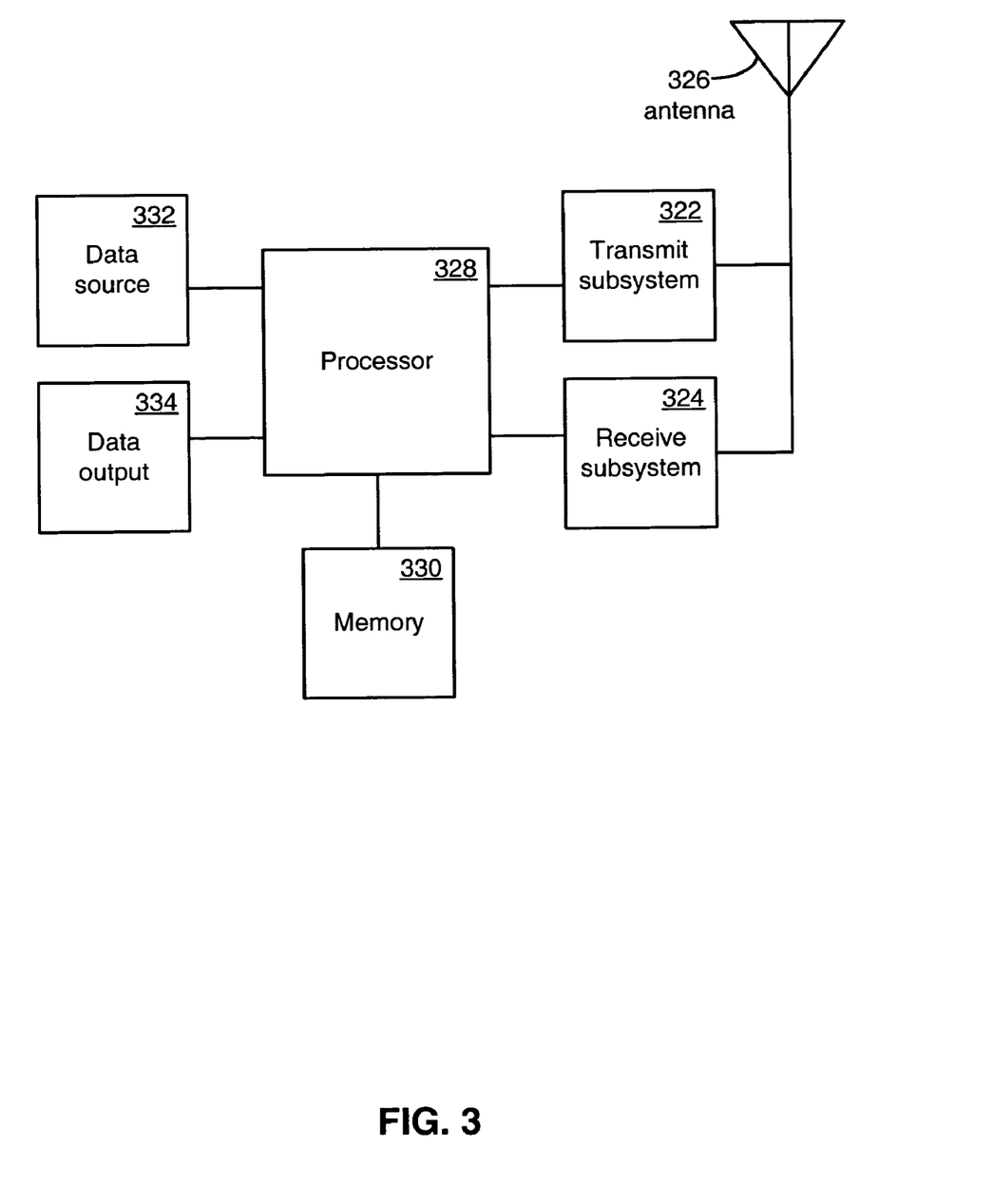
FIG. 3 is a functional block diagram illustrating the basic structural components of a wireless transceiver system in accordance with one embodiment.

Referring to FIG. 3, a functional block diagram illustrating the basic structural components of a wireless transceiver system in accordance with one embodiment is shown. As depicted in this figure, the system comprises a transmit subsystem 322 and a receive subsystem 324, each of which is coupled to an antenna 326. Transmit subsystem 322 and receive subsystem 324 may be collectively referred to as a transceiver subsystem. Transmit subsystem 322 and receive subsystem 324 access the forward and reverse links through antenna 326. Transmit subsystem 322 and receive subsystem 324 are also coupled to processor 328, which is configured to control transmit and receive subsystems 322 and 324. Memory 330 is coupled to processor 328 to provide working space and local storage for the processor. A data source 332 is coupled to processor 328 to provide data for transmission by the system. Data source 332 may, for example, comprise a microphone or an input from a network device. The data is processed by processor 328 and then forwarded to transmit subsystem 322, which transmits the data via antenna 326. Data received by receive subsystem 324 through antenna 326 is forwarded to processor 328 for processing and then to data output 334 for presentation to a user. Data output 334 may comprise such devices as a speaker, a visual display, or an output to a network device.

Considering the structure of FIG. 3 as implemented in a mobile station, the components of the system can be viewed as a transceiver subsystem coupled to a processing subsystem, where the transceiver subsystem is responsible for receiving and transmitting data over wireless channel and the processing subsystem is responsible for preparing and providing data to the transceiver subsystem for transmission and receiving and processing data that it gets from the transceiver subsystem. The transceiver subsystem could be considered to include transmit subsystem 322, receive subsystem 324 and antenna 326. The processing subsystem could be considered to include processor 328, memory 330, data source 332 and data output 334.

The transceiver subsystems of the base station and mobile station enable them to communicate via a wireless link. This wireless link may include a number of forward-link channels which are used to transmit data from the base station to the mobile station, as well as a number of reverse-link channels which are used to transmit data from the mobile station to the base station.

The quality of the wireless communication link between the base station and a mobile station may depend upon a variety of factors, many of which are constantly changing. For example, the quality of the link may vary with atmospheric conditions, geographic features, obstacles, the distance between the base station and the mobile station, and so on. Each of these factors may cause the quality of the communication link to change as the position of the mobile station changes, sometimes improving the quality of the link, and sometimes degrading it. It is typically necessary for the mobile station to take into account the resulting communication link quality in determining the parameters that will be used to transmit data from the mobile station to the base station in order to achieve an acceptable error rate for data transmitted over the link.

The factors mentioned above and their effects on the communication link are generally very difficult to predict or anticipate. It is therefore typically necessary to directly determine the quality of the communication link and then set the transmission parameters of the mobile station according to the quality of the link. This may require some overhead signaling back and forth between the mobile station and the base station. Thus, some of the resources of the system (e.g. mobile station power and communication link bandwidth) must be used for overhead rather than data transmissions.

While it is generally difficult, if not impossible, to anticipate changes in the factors that affect communication link quality and to set the transmission parameters accordingly, some generalizations can be made with respect to some of the factors. For example, with respect to the distance between the base station and the mobile station, it can be assumed that as the distance between the base station and the mobile station increases, the quality of the communication link will decrease (since the received energy of the transmitted signal typically decreases with distance). It may therefore be reasonable to assume that, when the mobile station is near the base station, the communication link will be capable of supporting higher data throughput then when the mobile station is far from the base station. As a practical matter, this means that the mobile station can use a shorter frame length (duration) or higher data rate to transmit data to the base station. When the mobile station is near the base station, it is also less likely that transmitting data at a higher rate (and at a corresponding higher power level) will generate interference that will significantly affect communications between mobile stations and other base stations. When the mobile station is far from the base station, on the other hand, it may be necessary to use a larger frame in order to achieve an acceptable error rate and to minimize the interference with mobile stations in other sectors.

The area within the sector of the base station can therefore be divided into regions, where in a "near" region, the communication link is capable of supporting a higher level of data throughput and, in a "far" region, the communication link is capable of supporting a lower level of data throughput. Consequently, when the mobile station is in the "near" region, the parameters for transmission data from the mobile station to the base station can be set in accordance with the higher level of data throughput. When the mobile station is in the "far" region, the transmission parameters can be set in accordance with the lower level of data throughput.

For example, in one embodiment, a mobile station may use either a 10 millisecond frame size, or a 2 millisecond frame size. When the 10 millisecond frame size is used, a frame of data is transmitted over the 10 millisecond duration of the frame. When the 2 millisecond frame size is used, the same amount of data is transmitted over a 2 millisecond duration. The data transmitted in the 2 millisecond frame must therefore be transmitted at a data rate which is five times the data rate used with the 10 millisecond frame. This higher data rate corresponds to a higher power level. Therefore, in this embodiment, the mobile station is configured to use the 2 millisecond frame size when the mobile station is in the "near" region of the sector, and to use the 10 millisecond frame size when the mobile station is in the "far" region.

In a preferred embodiment, the selection of an appropriate frame size for data transmissions from the mobile station is performed in conjunction with the process of performing soft handoff. As indicated above, mobile stations may be in communication with more than a single base station. Although the mobile station communicates primarily with a first one of the base stations, the mobile station may begin communicating with (e.g., listening to) other base stations in preparation for the possibility that the quality of the communication link to the first base station may degrade to the point that the mobile station should communicate primarily with a different one of the base stations. When the mobile station is communicating with multiple base stations, the mobile station is in soft handoff.

Figure 4:
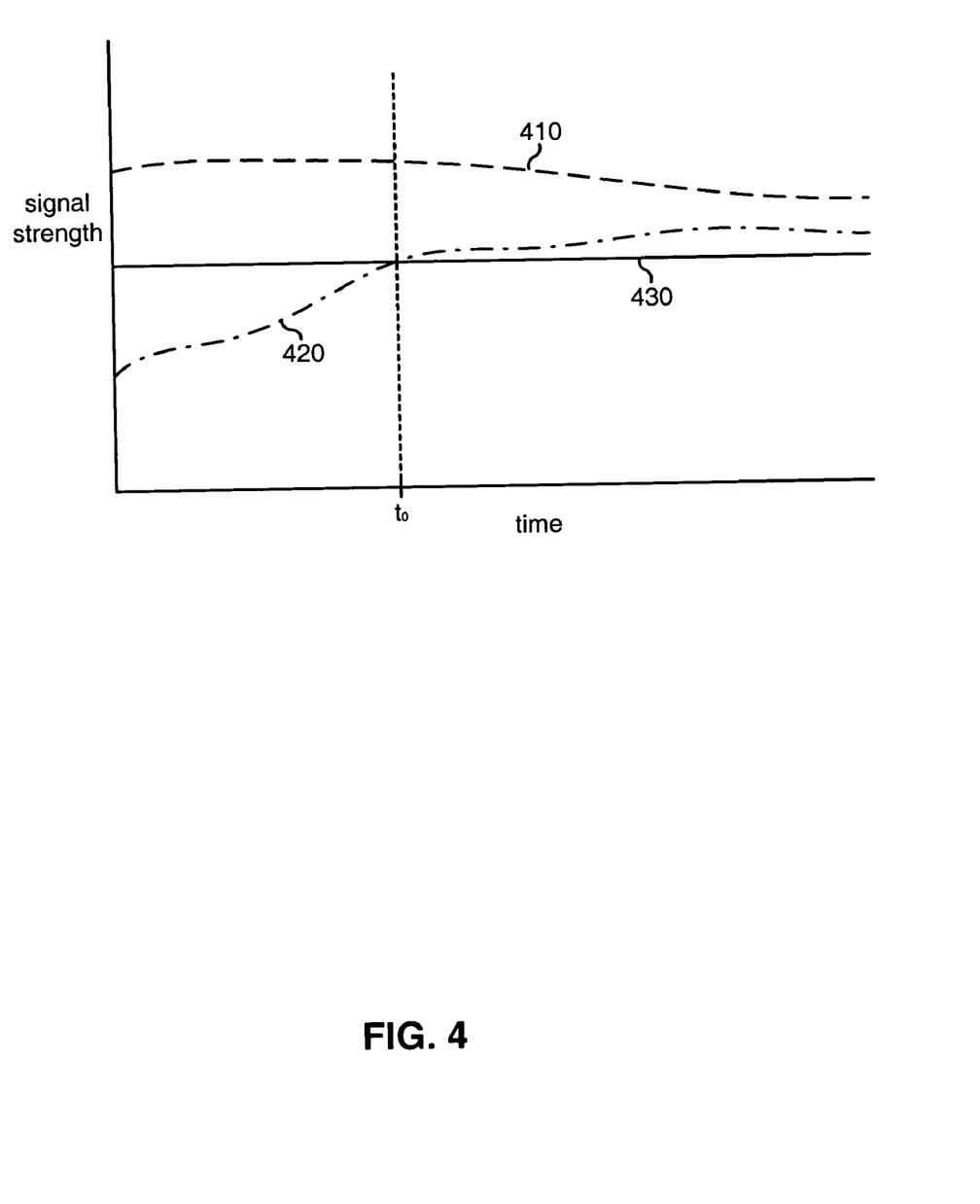
FIG. 4 is a diagram illustrating changes in the strengths of pilot signals from two different base stations, as measured by a single mobile station in accordance with one embodiment.

This may be illustrated by the diagram of FIG. 4. This figure illustrates changes in the strengths of pilot signals from two different base stations, as measured by a single mobile station. In this figure, curve 410 represents the strength of the pilot signal from a first base station as a function of time. Curve 420 represents the strength of the pilot signal from a second base station. Line 430 indicates a threshold pilot strength. When the pilot strength of a base station is greater than the threshold level, the communication link to that base station is strong enough for the base station to become part of the active set (the set of base stations with which the mobile station can communicate). Thus, before time t0, only one of the base stations (the first base station) is above the threshold. The strength of the pilot signal from the second base station is below the threshold during this time, but is increasing. At time t0, the pilot signal of the second base station reaches the threshold level. The mobile station could therefore be in soft handoff with the two base stations after time t0, until one of the base stations' pilot strengths drops below the threshold level.

It should be noted that, while the example above describes the mobile station's interaction with two base stations, there may be many more base stations involved. The mobile station monitors the pilot signal strengths of each of the base stations from which a pilot signal is received. The base stations for which the pilot signal strengths are above the threshold level typically comprise the active set for the mobile station.

The significance of the soft handoff in relation to various embodiments of the present invention is that, generally speaking, soft handoff occurs when a mobile station is located in the "far" region of the sector which is served by the first base station. In other words, because the sectors served by the different base stations overlap at the edges of the sectors away from the respective base stations (see FIG. 1), a mobile station which is in soft handoff will be near the edge of the sector, which generally coincides with the "far" region of the sector.

Referring again to FIG. 1, mobile station 16a is an example of a mobile station which is not in soft handoff. Mobile station 16a is served by base station 12a. Mobile station 16a is sufficiently far from base stations 12b and 12c that the signal strength from each of these base stations would be low and mobile station 16a would not be directed to communicate with either of these base stations. Mobile station 16b, the other hand, is an example of a mobile station which is most likely in soft handoff. While mobile station 16b may still be served primarily by base station 12a, it is sufficiently close to base station 12b that it may be directed to communicate with both of these base stations (i.e., 12a and 12b).

In one embodiment, the soft handoff mechanism for a mobile station involves monitoring the pilot signals from the various base stations and directing the mobile station to enter or leave a soft handoff state, depending upon the strengths of the various pilot signals. Then, when the mobile station is directed to enter or leave the soft handoff state, the mobile station not only enters or leaves soft handoff, but also sets the parameters for transmissions to the base station based upon whether or not the mobile station is then in soft handoff.

Figure 5:
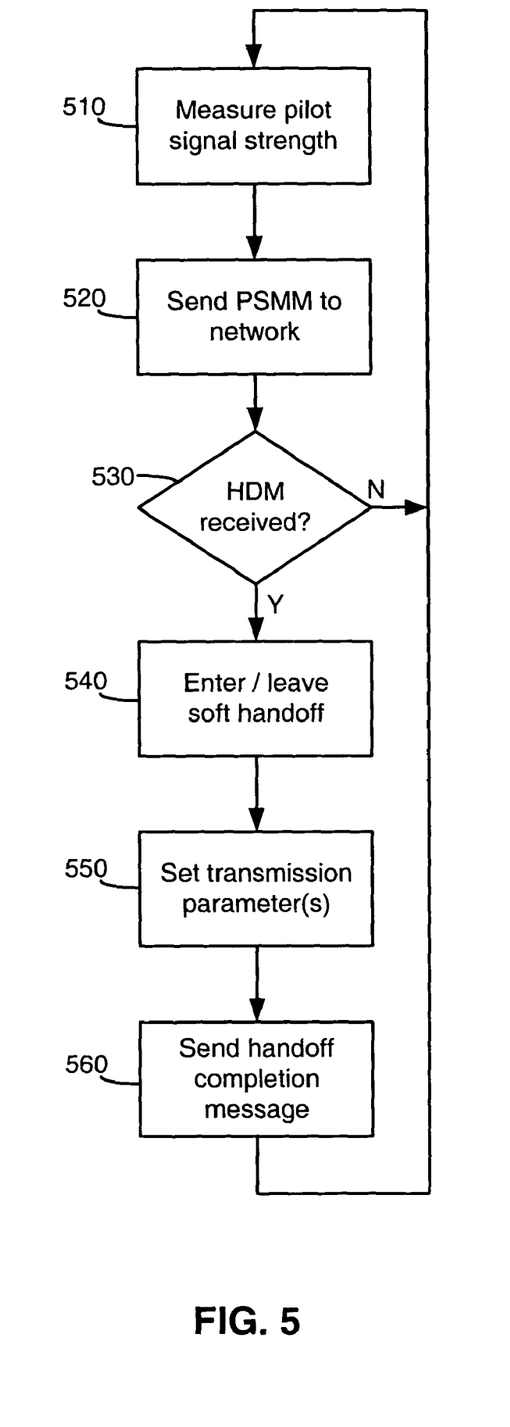
FIG. 5 is a flow diagram illustrating a method implemented in a mobile station in accordance with one embodiment.

Referring to FIG. 5, a flow diagram illustrating a method implemented in a mobile station in accordance with one embodiment of the present invention is shown. As depicted in this figure, the mobile station measures the strengths of the pilot signals received from the various base stations (block 510) and periodically sends pilot strength measurement messages (PSMMs) to the network (block 520). As will be explained in more detail below, the mobile station may receive a handoff direction message (HDM) from the network (block 530). The HDM may direct the mobile station either to enter soft handoff or leave soft handoff. The mobile station therefore enters or leaves soft handoff as directed by the HDM (block 540). The mobile station also sets the transmission parameters based upon whether the mobile station is directed by the HDM to enter or leave soft handoff (block 550). When the mobile station is finished entering or leaving soft handoff and setting the appropriate transmission parameters, a handoff completion message (HCM) is transmitted back to the network (block 560).

Figure 6:
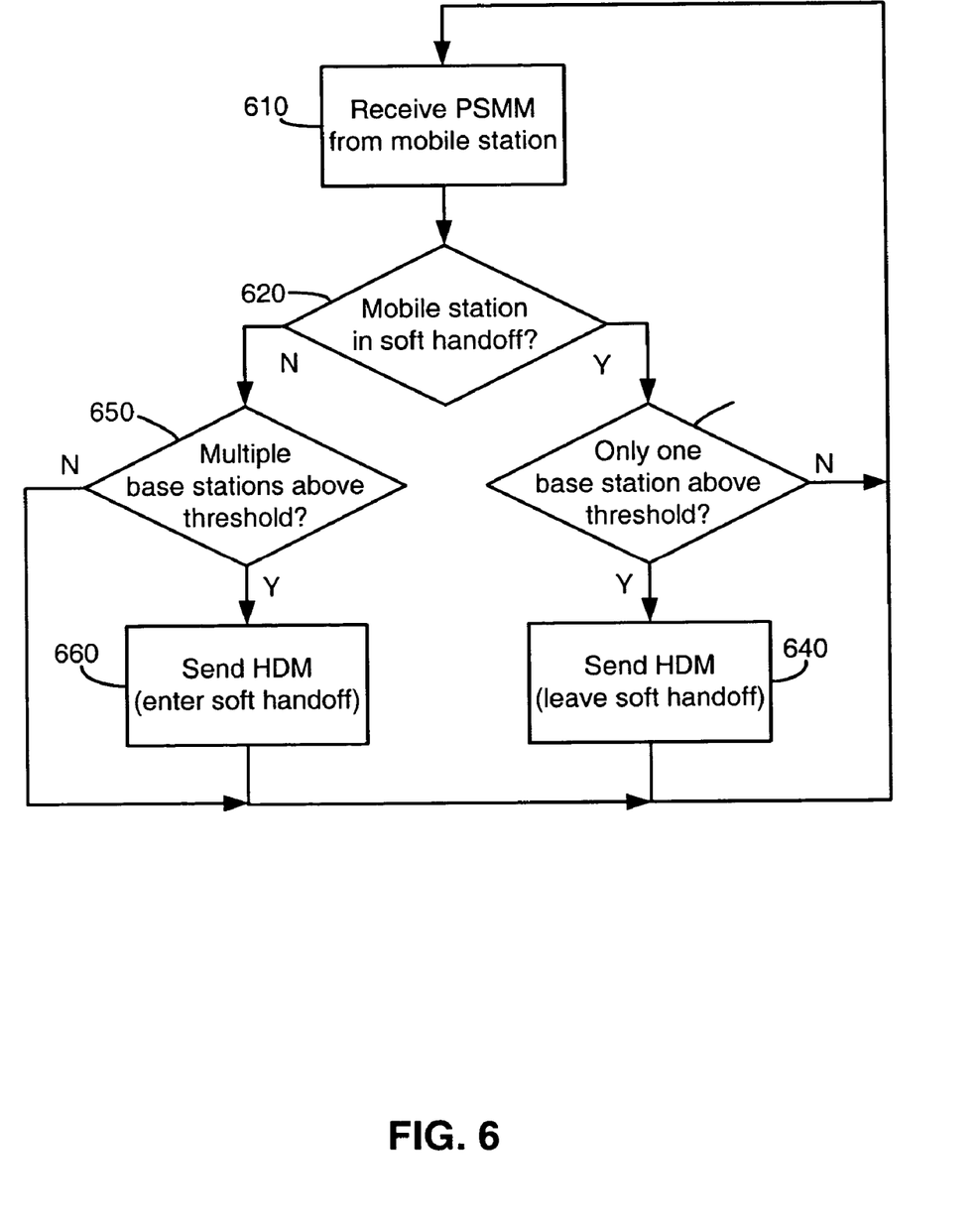
FIG. 6 is a flow diagram illustrating a method implemented in a base station in accordance with one embodiment.

Referring to FIG. 6, a flow diagram illustrating a method implemented in a base station in accordance with one embodiment of the present invention is shown. As shown in the figure, the network first receives one of the PSMMs (block 610). If the mobile station was previously in soft handoff (block 620), the network then examines the pilot signal strength information in the PSMM and determines whether there is only one base station for which the corresponding pilot signal strength remains above the threshold level (block 630). If there are still multiple base stations for which the corresponding pilot signal strengths are above the threshold, the mobile station should remain in soft handoff, so no action is taken by the network. If there is only one base station for which the corresponding signal strength is above the threshold, the mobile station should no longer be in soft handoff, so the network sends an HDM to the mobile station directing the mobile station to leave soft handoff (block 640).

If the mobile station was not previously in soft handoff (block 620), the network examines the pilot signal strength information in the PSMM and determines whether there are multiple base stations for which the corresponding pilot signal strengths above the threshold level (block 650). If there is still only one base station for which the corresponding pilot signal strength is above the threshold, the mobile station still should not be in soft handoff, so no action is taken by the network. If there are multiple base stations for which the corresponding pilot signal strengths are above the threshold, the mobile station should be in soft handoff, so the network sends an HDM to the mobile station directing the mobile station to enter soft handoff (block 660).

It should be noted that the use of a threshold pilot signal strength level as described above for determining whether or not various base stations should be in a mobile station's active set is exemplary. The threshold may be set at a constant level, or it may vary, depending upon the particular circumstances that exist at a particular time. For instance, the threshold may be set at a level that is a certain amount lower than the level of the strongest pilot signal. Alternatively, the threshold may comprise a set of threshold conditions. For example, there may be an absolute threshold, below which no base station may be in the active set, and a variable threshold that may be set at a level that allows no more than a predetermined number of base stations to be in the active set. Many other variations are also possible.

The embodiments described above make use of an existing mechanism to set parameters for the transmission of data from a mobile station to a base station. In particular, a soft handoff status is used to set a frame size for transmissions from the mobile station to the base station. The use of this existing mechanism enables the control of the frame size based upon the rough estimation of the mobile station's position (e.g., near the edge of the sector, where soft handoff typically occurs) without adding the overhead of explicitly communicating the position of the mobile station. In other embodiments, it may be possible to use other existing mechanisms and to control other transmission parameters using these mechanisms.

It should be noted that, in the embodiments described above, method steps can be interchanged without departing from the scope of the invention. The steps of the methods described above may be embodied in hardware, software, firmware or any combination thereof. The method steps may comprise instructions configured to cause a data processor to perform the corresponding method, and the instructions may be embodied in a medium readable by the data processor, such as RAM, ROM, flash memory, EPROM, EEPROM, registers, hard disks, removable disks, CD-ROMs, or any other storage medium known in the art. The storage medium may be integral to the data processor, or it may be external.

While, in some of the descriptions above, references are made to signals, parameters, and procedures associated with particular standards (e.g., cdma2000, Rel. D), the invention is not limited to embodiments that conform to these standards.

It will be appreciated by those of ordinary skill in the art of the invention that the generic descriptions above are applicable to systems and methods that conform to other standards, and that such alternative embodiments are within the scope of the invention.

It will also be appreciated by those of ordinary skill in the art of the invention that the information and signals described above may be represented using any variety of different technologies and techniques. For example, data, instructions, commands, bits, symbols, chips and various other information and signals may be represented by voltages, currents, electromagnetic waves, magnetic fields, optical fields, or the like.

Those of ordinary skill in the art of the invention will further appreciate that the various logical or functional blocks, modules, circuits, components, algorithm steps and the like that are described in connection with the foregoing embodiments may be implemented as hardware, software, firmware, or combinations thereof. Further, each of these logical or functional blocks, etc., may themselves be implemented in a variety of different configurations. For example, one or more of the logical or functional blocks may be implemented or performed with a data processor that may comprise a general-purpose processor, a microprocessor, a microcontroller, a state machine, a digital signal processor (DSP), an application specific integrated circuit (ASIC), a field programmable gate array (FPGA), or other programmable logic devices, discrete gate or transistor logic, discrete hardware components, or any combination thereof.

The various aspects and features of the present invention have been described above with regard to specific embodiments. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A wireless communication system comprising:
a network;
a base station coupled to the network; and
a mobile station coupled to the base station via a wireless communication link;
wherein the network is configured to direct the mobile station to enter or leave soft handoff; and
wherein the mobile station is configured to modify a transmission parameter in response to the network directing the mobile station to enter or leave soft handoff, wherein the transmission parameter comprises a frame size, wherein if the mobile station is directed to enter soft handoff, the frame size is set to a first size and wherein if the mobile station is directed to leave soft handoff, the frame size is set to a second size, wherein the first size is greater than the second size, and wherein the first size is 10 ms and the second size is 2 ms.

2. A mobile station configured to operate in a wireless communication system, comprising:
a transceiver subsystem configured to communicate via a wireless link;
a processing subsystem configured to set a transmission parameter of the wireless link, wherein the transmission parameter comprises comprising a frame size defining a time over which a frame of data is transmitted, wherein the processing subsystem sets the frame size to a first value or a second value in response to detecting that the mobile station is entering or leaving soft handoff; and wherein the transceiver subsystem is further configured to transmit data on a reverse link of the wireless link in accordance with the frame size.

3. A mobile station as recited in claim 2, wherein the processing subsystem is configured to detect that the mobile station is entering or leaving soft handoff based upon a received handoff direction message (HDM).

4. A mobile station as recited in claim 3, wherein the processing subsystem is configured to set the frame size to the first value if the HDM directs the mobile station to enter soft handoff, and to set the frame size to the second value if the HDM directs the mobile station to leave soft handoff.

5. A mobile station as recited in claim 4, wherein the first value is greater than the second value.

6. A mobile station as recited in claim 3, wherein the processing subsystem is configured to send a handoff completion message after receiving the HDM.

7. A mobile station as recited in claim 2, wherein the transceiver subsystem is configured measure a pilot signal strength for each of one or more base stations and to periodically transmit one or more pilot strength measurement messages to a network connected to the base stations.

8. A mobile station configured to operate in a wireless communication system comprising:
  a processing subsystem; and
  a transceiver subsystem;
  wherein the transceiver subsystem is configured to communicate via a wireless link, and wherein the processing subsystem is configured to set a transmission parameter of the wireless link for the transceiver subsystem in response to detecting that the mobile station is entering or leaving soft handoff, to detect that the mobile station is entering or leaving soft handoff based upon a received handoff direction message (HDM), to set the transmission parameter to a first value if the HDM directs the mobile station to enter soft handoff, and to set the transmission parameter to a second value if the HDM directs the mobile station to leave soft handoff, wherein the transmission parameter comprises a frame size defining a time over which a frame of data is transmitted, and wherein the first value is greater than the second value.

9. A method implemented in a wireless communication system, comprising:
  detecting a mobile station communicating via a wireless link entering or leaving soft handoff; and
  modifying a transmission parameter of the wireless link for the mobile station in response to detecting the mobile station entering or leaving soft handoff;
  wherein the transmission parameter comprises a frame size defining a time over which a frame of data is transmitted, wherein if the mobile station is detected entering soft handoff, the frame size is set to a first size and wherein if the mobile station is detected leaving soft handoff, the frame size is set to a second size.

10. A method as recited in claim 9, wherein the first size is greater than the second size.

11. A method as recited in claim 9, further comprising the mobile station measuring a pilot signal strength for each of one or more base stations and periodically transmitting one or more pilot strength measurement messages to a network.

12. A method as recited in claim 11, wherein detecting the mobile station entering or leaving soft handoff comprises identifying a change in a number of base stations in an active set for the mobile station based on the pilot strength measurement messages.

13. A method as recited in claim 12, further comprising sending a handoff direction message (HDM) from the network to the mobile station in response to detecting the change in the number of base stations in the active set.

14. A method as recited in claim 13, wherein modifying the transmission parameter for the mobile station is performed in response to receiving the HDM from the network.

15. A method as recited in claim 14, further comprising transmitting a handoff completion message from the mobile station to the network after receiving the HDM.

16. A method implemented in a wireless communication system, comprising:
  detecting a mobile station entering or leaving soft handoff; and
  modifying a transmission parameter for the mobile station in response to detecting the mobile station entering or leaving soft handoff, wherein the transmission parameter comprises a frame size, wherein if the mobile station is detected entering soft handoff, the frame size is set to a first size and wherein if the mobile station is detected leaving soft handoff, the frame size is set to a second size, wherein the first size is greater than the first size, and wherein the first size is 10 ms and the second size is 2 ms.

17. A method implemented in a mobile station, comprising:
  communicating via a wireless link;
  detecting that the mobile station is entering or leaving soft handoff;
  if the mobile station is entering soft handoff, setting a transmission parameter of the wireless link to a first value; and
  if the mobile station is leaving soft handoff, setting the transmission parameter of the wireless link to a second value;
  wherein the transmission parameter comprises frame size defining a time over which a frame of data is transmitted.

18. A method as recited in claim 17, wherein detecting that the mobile station is entering or leaving soft handoff comprises receiving a handoff direction message (HDM) from a network.

19. A method as recited in claim 18, further comprising transmitting a handoff completion message to the network after receiving the HDM.

20. A method as recited in claim 17, further comprising measuring a pilot signal strength for each of one or more base stations and periodically transmitting one or more pilot strength measurement messages to a first one of the base stations.

21. A method as recited in claim 17, wherein the first value is greater than the second value.

22. A method as recited in claim 17, further comprising:
  modifying the transmission parameter for the mobile station in response to detecting the mobile station entering or leaving soft handoff.

23. A method as recited in claim 22, wherein the first value is a first frame size and the second value is a second frame size.

24. A method as recited in claim 23, wherein the first frame size is greater than the second frame size.

25. A method as recited in claim 17, wherein if the mobile station is entering soft handoff, configuring the mobile station to transmit at a first data rate, and if the mobile station is leaving soft handoff, configuring the mobile station to transmit at a second data rate.

26. A method as recited in claim 25, wherein the first data rate is less than the second data rate.

27. A method as recited in claim 26, wherein the first data rate is five times less than the second data rate.

28. A method implemented in a mobile station, comprising:
- detecting that the mobile station is entering or leaving soft handoff;
- if the mobile station is entering soft handoff, setting a transmission parameter to a first value; and
- if the mobile station is leaving soft handoff, setting the transmission parameter to a second value, wherein the transmission parameter comprises a frame size, wherein the first value is greater than the second value, and wherein the first value is 10 ms and the second value is 2 ms.

29. An apparatus for wireless communication, comprising:
- means for detecting that a mobile station communicating via a wireless link is entering or leaving soft handoff;
- means for setting a transmission parameter of the wireless link to a first value if the mobile station is entering soft handoff; and
- means for setting the transmission parameter of the wireless link to a second value if the mobile station is leaving soft handoff, the transmission parameter comprising a frame size defining a time over which a frame of data is transmitted.

30. The apparatus of claim 29, wherein the means for detecting that the mobile station is entering or leaving soft handoff comprises means for receiving a handoff direction message (HDM) from a network.

31. The apparatus of claim 30, further comprising means for sending a handoff completion message to the network after receiving the HDM.

32. The apparatus of claim 29, further comprising:
- means for measuring a pilot signal strength for each of one or more base stations; and
- means for periodically transmitting one or more pilot strength measurement messages to a first one of the base stations.

33. The apparatus of claim 29, wherein the first value is greater than the second value.

34. The apparatus of claim 29, further comprising:
- means for transmitting data on reverse link in accordance with the frame size.

35. An apparatus for wireless communication, comprising:
- means for detecting that a mobile station is entering or leaving soft handoff;
- means for setting a transmission parameter to a first value if the mobile station is entering soft handoff; and
- means for setting the transmission parameter to a second value if the mobile station is leaving soft handoff, the transmission parameter comprising a frame size,
- wherein the first value is 10 ms than the second value is 2 ms.

36. A non-transitory processor-readable medium including instructions stored thereon, comprising:
- instructions for detecting that a mobile station communicating via a wireless link is entering or leaving soft handoff;
- instructions for setting a transmission parameter of the wireless link to a first value if the mobile station is entering soft handoff; and
- instructions for setting the transmission parameter of the wireless link to a second value if the mobile station is leaving soft handoff, the transmission parameter comprising a frame size defining a time over which a frame of data is transmitted.

37. The processor-readable medium of claim 36, further comprising:
- instructions for receiving a handoff direction message (HDM) from a network.

38. The processor-readable medium of claim 37, further comprising:
- instructions for sending a handoff completion message to the network after receiving the HDM.

39. The processor-readable medium of claim 36, further comprising:
- instructions for obtaining a pilot signal strength for each of one or more base stations; and
- instructions for periodically sending one or more pilot strength measurement messages to a first one of the base stations.

40. The processor-readable medium of claim 36, wherein the first value is greater than the second value.

41. The processor-readable medium of claim 36, further comprising:
- instructions for directing transmission of data on reverse link in accordance with the frame size.

42. The processor-readable medium as recited in claim 36, wherein the first value is 10 ms and the second value is 2 ms.

43. An apparatus for wireless communication, comprising:
- means for detecting a mobile station communicating via a wireless link entering or leaving soft handoff; and
- means for modifying a transmission parameter of the wireless link for the mobile station in response to detecting the mobile station entering or leaving soft handoff;
- wherein the transmission parameter comprises a frame size defining a time over which a frame of data is transmitted, wherein if the mobile station is detected entering soft handoff, the frame size is set to a first size and wherein if the mobile station is detected leaving soft handoff, the frame size is set to a second size.

44. The apparatus as recited in claim 43, wherein the first size is 10 ms and the second size is 2 ms.

45. A non-transitory processor-readable medium including instructions stored thereon, comprising:
- instructions for detecting a mobile station communicating via a wireless link entering or leaving soft handoff; and
- instructions for modifying a transmission parameter of the wireless link for the mobile station in response to detecting the mobile station entering or leaving soft handoff;
- wherein the transmission parameter comprises a frame size defining a time over which a frame of data is transmitted, wherein if the mobile station is detected entering soft handoff, the frame size is set to a first size and wherein if the mobile station is detected leaving soft handoff, the frame size is set to a second size.

46. The processor-readable medium as recited in claim 45, wherein the first size is 10 ms and the second size is 2 ms.

* * * * *